United States Patent
Neagovici-Negoescu et al.

(10) Patent No.: US 7,644,107 B2
(45) Date of Patent: Jan. 5, 2010

(54) SYSTEM AND METHOD FOR BATCHED INDEXING OF NETWORK DOCUMENTS

(75) Inventors: Mircea Neagovici-Negoescu, Bellevue, WA (US); David James Lee, Redmond, WA (US); Kyle Peltonen, Issaquah, WA (US); Dmitriy Meyerzon, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 264 days.

(21) Appl. No.: 10/956,891

(22) Filed: Sep. 30, 2004

(65) Prior Publication Data

US 2006/0074911 A1  Apr. 6, 2006

(51) Int. Cl.
*G06F 12/00* (2006.01)
*G06F 17/00* (2006.01)

(52) U.S. Cl. .................. 707/203; 715/229
(58) Field of Classification Search ......... 707/1–206; 715/229
See application file for complete search history.

(56) References Cited

U.S. PATENT DOCUMENTS

| | | | | |
|---|---|---|---|---|
| 5,956,722 A * | 9/1999 | Jacobson et al. | ............... | 707/10 |
| 6,038,610 A | 3/2000 | Belfiore et al. | ............... | 709/300 |
| 6,269,370 B1 | 7/2001 | Kirsch | ............... | 707/10 |
| 6,415,319 B1 * | 7/2002 | Ambroziak | ............... | 709/219 |
| 6,418,452 B1 | 7/2002 | Kraft et al. | ............... | 707/200 |
| 6,418,453 B1 * | 7/2002 | Kraft et al. | ............... | 707/200 |
| 6,424,966 B1 | 7/2002 | Meyerzon et al. | ............... | 707/3 |
| 6,631,369 B1 | 10/2003 | Meyerzon et al. | ............... | 707/4 |
| 7,010,532 B1 * | 3/2006 | Stakutis et al. | ............... | 707/10 |
| 7,085,755 B2 * | 8/2006 | Bluhm et al. | ............... | 707/3 |
| 2003/0004952 A1 * | 1/2003 | Nixon et al. | ............... | 707/10 |
| 2004/0064442 A1 * | 4/2004 | Popovitch | ............... | 707/3 |
| 2005/0086206 A1 * | 4/2005 | Balasubramanian et al. | ... | 707/3 |
| 2005/0289133 A1 * | 12/2005 | Arrouye et al. | ............... | 707/4 |
| 2005/0289193 A1 * | 12/2005 | Arrouye et al. | ............... | 707/200 |
| 2007/0050338 A1 * | 3/2007 | Strohm et al. | ............... | 707/3 |

FOREIGN PATENT DOCUMENTS

| | | |
|---|---|---|
| CA | 2 279 119 A1 | 1/2001 |
| WO | WO 02/42862 A2 | 5/2002 |

OTHER PUBLICATIONS

Fiedler, J. et al., "Using the Web Efficiently: Mobile Crawlers", Seventeenth Annual International Conference of the Association of Management on Computer Science, Aug. 1999, pp. 324-329.

\* cited by examiner

*Primary Examiner*—John E Breene
*Assistant Examiner*—Joshua Bullock
(74) *Attorney, Agent, or Firm*—Merchant & Gould P.C.

(57) ABSTRACT

A process takes advantage of a structure of a server hosting a network site that includes a change log stored in a database to batch index documents for search queries. The content of the site is batched and shipped in bulk from the server to an indexer. The change log keeps track of the changes to the content of the site. The indexer incrementally requests updates to the index using the change log and batches the changes so that the bandwidth usage and processor overhead costs are reduced.

21 Claims, 7 Drawing Sheets

SYSTEM AND METHOD FOR BATCHED INDEXING OF NETWORK DOCUMENTS

CROSS-REFERENCE TO RELATED APPLICATIONS

The present invention is related to a patent application having Ser. No. 09/493,748, entitled "Adaptive Web Crawling Using a Statistical Model", filed on Jan. 28, 2000. The present invention is also related to U.S. Pat. No. 6,067,541, entitled, "Monitoring Document Changes in a File System of Documents with the Document Change Information Stored in a Persistent Log", that issued on May 23, 2000. The related application and patent are assigned to the assignee of the present patent application and are hereby incorporated by reference.

BACKGROUND OF THE INVENTION

Searches among networks and file systems for content have been provided in many forms but most commonly by a variant of a search engine. A search engine is a program that searches documents on a network for specified keywords and returns a list of the documents where the keywords were found. Often, the documents on the network are first identified by "crawling" the network.

Crawling the network refers to using a network crawling program, or a crawler, to identify the documents present on the network. A crawler is a computer program that automatically discovers and collects documents from one or more network locations while conducting a network crawl. The crawl begins by providing the crawler with a set of document addresses that act as seeds for the crawl and a set of crawl restriction rules that define the scope of the crawl. The crawler recursively gathers network addresses of linked documents referenced in the documents retrieved during the crawl. The crawler retrieves the document from a Web site, processes the received document data from the document and prepares the data to be subsequently processed by other programs. For example, a crawler may use the retrieved data to create an index of documents available over the Internet or an intranet. A "search engine" can later use the index to locate documents that satisfy specified criteria.

For retrieving documents in a crawl, an operation for each document on the network is executed to get the document and populate the index with records for the documents. These roundtrip queries for documents can consume a great deal of overhead with regard to bandwidth and processor utilization. Also, for accurate results to be provided by the search engine, the index also needs to be accurate with regard to the documents on the network. If the documents on the network change, by altering documents, adding documents, deleting documents, or other operations, the index needs to be updated to reflect these changes. However, crawls of the network can be expensive operations. Having to roundtrip back and forth to the network can overtax the bandwidth available between the indexer and the network.

SUMMARY OF THE INVENTION

Embodiments of the present invention are related to a system and method for batched indexing of a web site that mitigates the bandwidth used when crawling a network for documents. The present invention takes advantage of the structure of a server hosting a network site that includes a change log stored in a database or other repository. The present invention batches the content of the site and ships the content in bulk from the server to an indexer.

In accordance with one aspect of the present invention, a batch size limit is set for transmitting batches of documents to an indexer. Metadata corresponding to each of the documents is examined and the documents are selected to be included in the batch. The batch of documents is then forwarded to the indexer.

In accordance with one aspect of the present invention, all the changes in the network are recorded in change logs. The change log records add, remove, modify, move, rename, and other document altering operations. The change log idicates which documents have changed. Generally, most of the documents on the network do not change between two crawls, but without the change log a crawler would be required to roundtrip for each document to get the last modified time. The changes are then retrieved by the indexer from the change log using service call that batches a specified number of the changes. The service call prevents repeating an operation to retrieve each document that has changed and instead allows a large number of the changes to be forwarded to the indexer at one time. Accordingly, the number of database queries required to be sent to the network are reduced, effectively reducing the overhead of updating the index.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
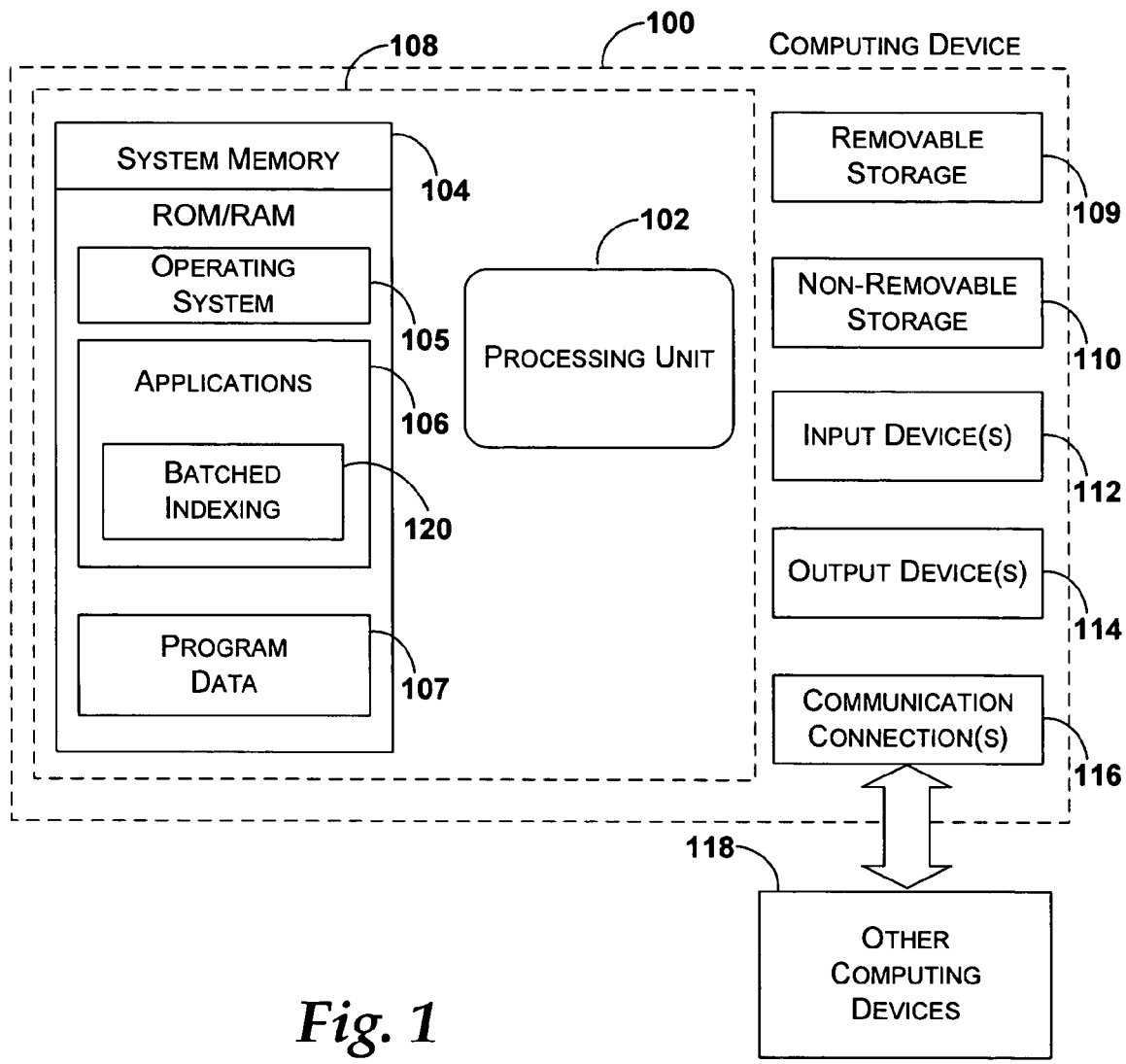
FIG. 1 illustrates an exemplary computing device that may be used in one exemplary embodiment of the present invention.

With reference to FIG. 1, one exemplary system for implementing the invention includes a computing device, such as computing device 100. Computing device 100 may be configured as a client, a server, mobile device, or any other computing device. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 includes a batched indexing application 120 for implementing the functionality of the present invention. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Embodiment for Batched Indexing

Throughout the following description and the claims, the term "document" refers to any possible resource that may be returned by as the result of a search query or crawl of a network, such as network documents, files, folders, web pages, and other resources.

Figure 2:
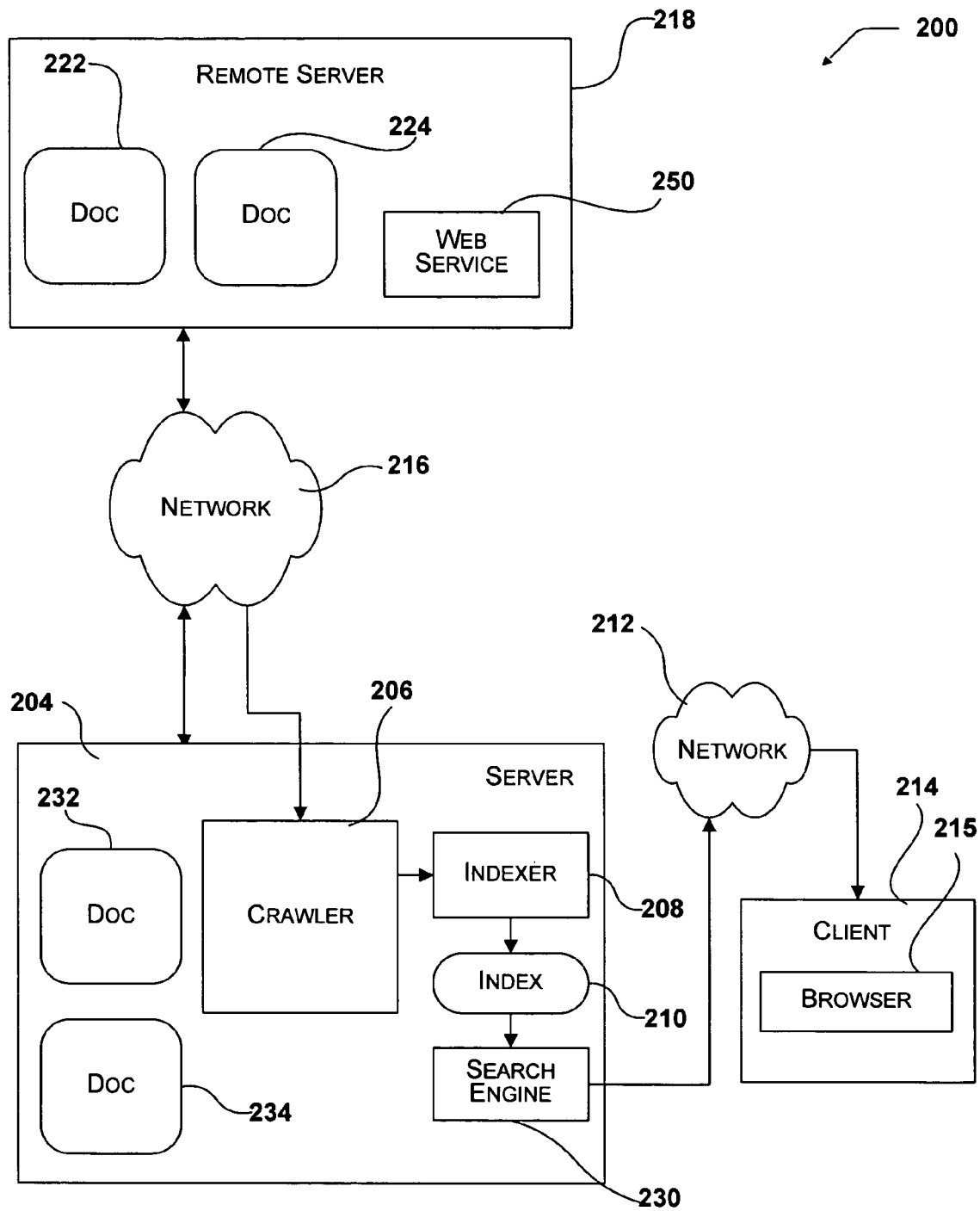
FIG. 2 illustrates an exemplary architecture of a networked system in which the present invention operates.

FIG. 2 illustrates an exemplary architecture of a networked system in which the present invention operates. A server 204 includes a crawler 206 executing thereon. Crawler 206 searches for documents distributed on one or more computing devices connected to network 216, such as remote server 218 depicted in FIG. 2. Network 216 may be a local area network, a wide area network, or a combination of networks that allow server 204 to communicate with remote computing devices, such as remote server 218, either directly or indirectly.

Crawler 206 searches ("crawls") remote server 218 connected to network 216 for documents 222 and 224. Crawler 206 retrieves documents as document data. The document data from the documents 222 and 224 can be used in a variety of ways. For example, crawler 206 may pass the document data to indexer 208. Indexer 208 is a computer program that maintains an index 210 of documents. The type of information stored in index 210 depends upon the complexity of indexer 208.

In accordance with the present invention, indexer 208 and remote server 218 may be configured to operate in accordance with a web service 250. For example, remote server 218 may be configured according to Windows SharePoint Services technology produced by Microsoft Corporation of Redmond, Wash. to include web service 250. Accordingly, a web service call may be utilized to query web service 250 for the document located on remote server 218. Web service 250 then communicates with an application programming interface (API) that is exposed by a database associated with the documents on remote server 218. The application programming interface enumerates the documents present in the database and allows the document data corresponding to the documents to be returned and indexed by indexer 208. Accordingly, the roundtrips to and from remote server 218 are significantly reduced due to the return of multiple sets of document data from the single web services call. The return of results are effectively "batched" together. Other embodiments may utilize other resident code on remote server 218, or utilize other communication protocols than a web services call in providing the batched indexing of the network documents. A more detailed description of the communication between an indexer and a web service is provided in the discussion of FIG. 3 below.

A client computer 214, such as a personal computer, is connected to the server by a network 212. Network 212 may be a local area network, a wide area network, or a combination of networks. Network 212 may be the same network as the network 216 or a different network. Client computer 214 includes a computer program, such as a "browser" 215 that locates and displays documents to a user.

When a user at client computer 214 desires to search for one or more documents, client computer 214 transmits a search request to search engine 230. Search engine 230 examines its associated index 210 to find documents that may relate to the search request. Search engine 230 may then return a list of those documents to the browser 215 at the client computer 214. The user can examine the list of documents and retrieve one or more from remote computing devices such as remote server 218.

In another embodiment, server 204 itself may include documents 232 and 234 that are accessed by crawler 206. Also crawler 206, indexer 208, and search engine 230 may reside on different computers. Additionally, browser 215 and crawler 206 may reside on a single computer.

Figure 3:
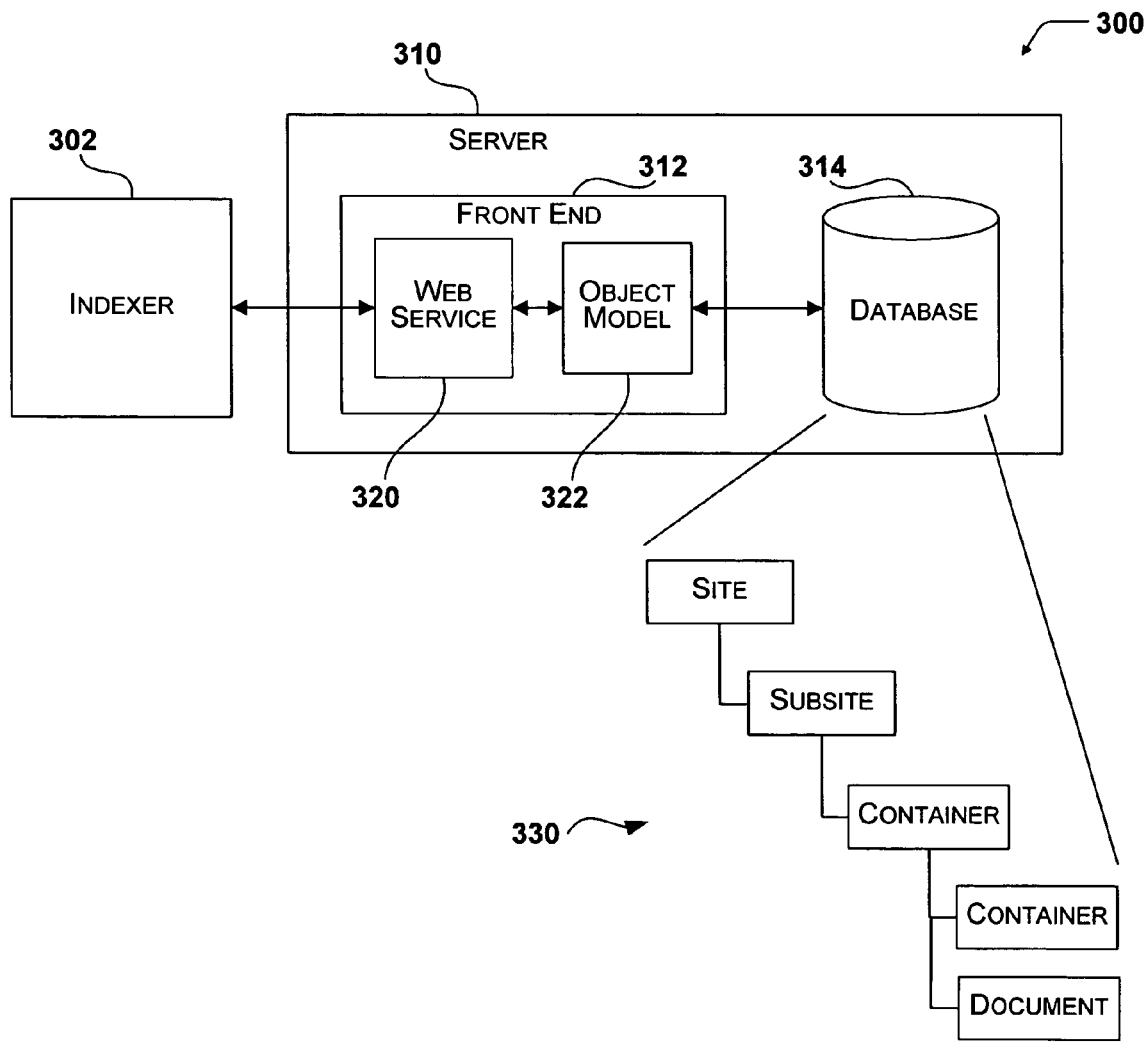
FIG. 3 illustrates a functional block diagram for an exemplary communication system between an indexer and server for batched indexing of network documents in accordance with the present invention.

FIG. 3 illustrates a functional block diagram for an exemplary communication system between an indexer and server for batched indexing of network documents in accordance with the present invention. System 300 includes an indexer 302 and server 310. Server 310 includes a front end 312 and a database 314. Front end 312 includes web service 320 and object model 322.

Indexer 302 maintains an index of the documents located on a network. Indexer is shown to communicate with server 310, however, other intermediate functional blocks may facilitate the communication between indexer 302 and server 310. For example, FIG. 2 illustrates a crawler 206 that provides communication between indexer 208 and remote server 218 across network 216. In at least one embodiment, the intermediary functional blocks do not affect the functionality of the present invention and are therefore not shown.

Indexer 302 communicates with web service 320 to obtain the document data for populating the index. Web service 320 in turn communicates with object model 322 to request the document data from database 314. In one embodiment, database 314 is organized according to the illustrated hierarchy 330. Hierarchy 330 is structured as a site that includes subsites. Each subsite includes one or more containers that can further include other containers or documents. In one embodiment, hierarchy 330 is structured similar to a file system of a computing device.

For an initial crawl, indexer 302 is aware of the site associated with server 310 and indexer 302 provides a web service call to web service 320 that requests information about the site. The request is forwarded by web service 320 to object model 322. Object model 322 provides an object for each of the documents, containers, and subsites of the site included in database 314. In other embodiments, other structures in database 314 may also have objects provided by object model 322 (e.g., lists, list items, document libraries, etc.). Object model 322 returns a list of subsite objects to web service 320, which propagates that list to indexer 302 as a list of URLs (Uniform Resource Locators). In one embodiment, the list of subsites is not provided to the indexer according to the batching functionality of the present invention when the number of subsites is below a specified number.

Using the list of subsites, indexer 302 provides web service calls that request information about each of the subsites, similar to the previous web service call requesting information about the site. Again, the request is forwarded by web service 320 to object mode 322. Object model 322 then returns a list to indexer 302 of the containers within the subsite for which the request was made. In one embodiment, the list of subsites is not provided to the indexer according to the batching functionality of the present invention when the number of subsites is below a specified number. Batching of the containers, documents, or other object related structures in the database hierarchy involves examining metadata about the object related structures and collecting the structures in a batch for transmission to indexer 302. An exemplary process for batch indexing of the site is described in the discussion of FIG. 4 below.

Figure 4:
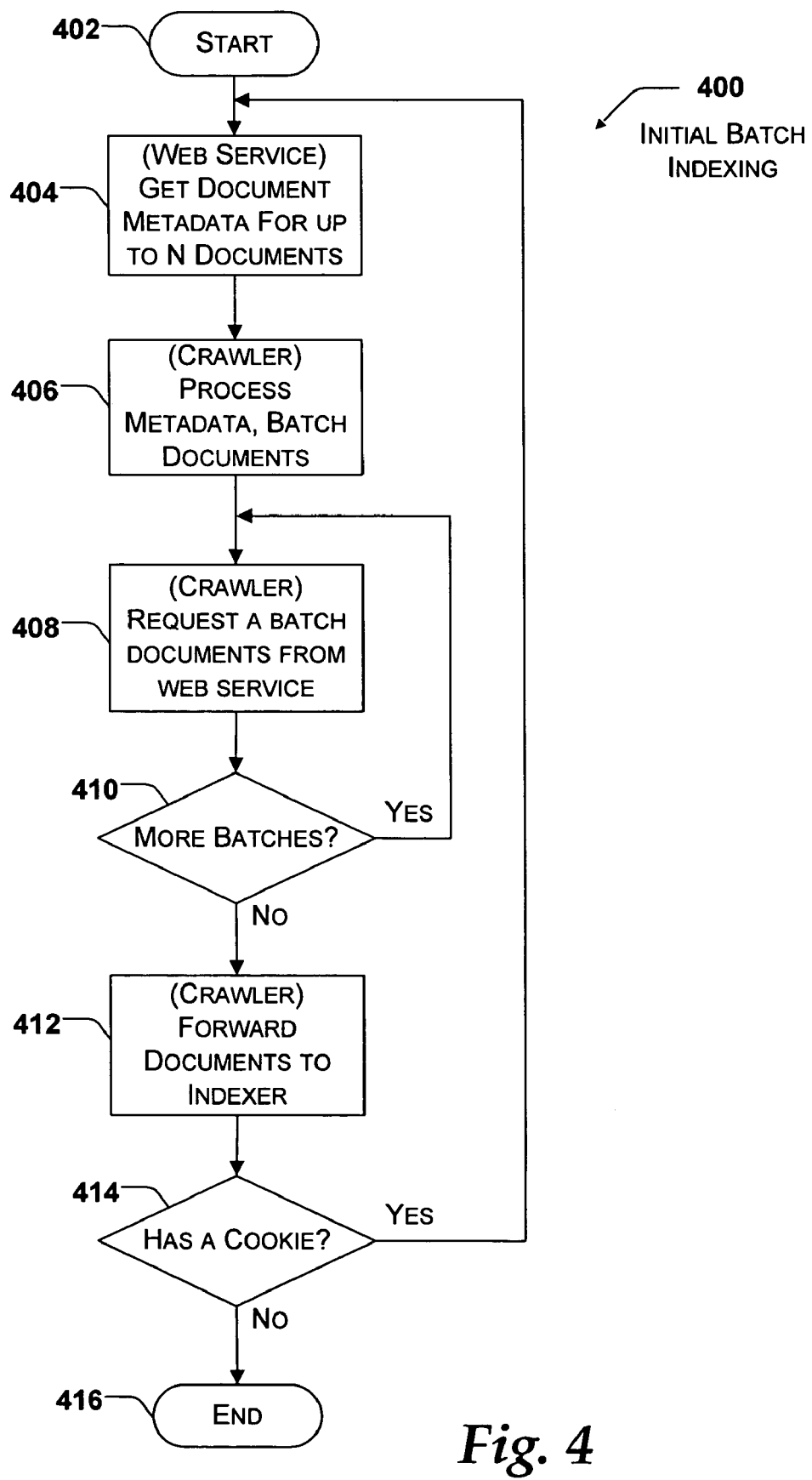
FIG. 4 illustrates a logical flow diagram of an exemplary process batch indexing during the initial crawl in accordance with the present invention.

FIG. 4 illustrates a logical flow diagram of an exemplary process batch indexing during the initial crawl in accordance with the present invention. Process 400 starts at block 402 where a web service call has been sent by the indexer to a server hosting a network site requesting document data for indexing. Processing continues at block 404.

At block 404, the web service gets document metadata for up to N documents, where N is set according to a specified limit (e.g., 1000 items). The document metadata is retrieved by the web service from the database. In other embodiments, the limit for items may be set to another limit, or may not have an associated limit. The metadata includes the document extension, the document size, and other metadata that assists in efficiently batching the documents for transmission to the indexer. In another embodiment, a container may be larger than N items. If the container contains more than N items, the web service also returns a cookie that will be passed in the next web service call so that the web service knows to get the next N documents from the database. Once the web service retrieves the document metadata, processing continues at block 406.

At block 406, the crawler processes the metadata retrieved by the web service and groups the documents related to the metadata into batches according to a batch size limit. In one embodiment, the batch size limit is associated with a size of the batch in terms of bytes (e.g., 50 MB). In another embodiment, the batch size limit is associated with the number documents included in the batch. In still another embodiment, the indexer sets a maximum size limit, and the web service then determines an efficient size lower than the maximum for batching the documents. One determination of an efficient size corresponds to a batch size where the number of queries to the database is minimized while also minimizing the bandwidth utilization between the indexer and server.

In one embodiment, a document that is a certain type according to its extension (e.g., mpg) may be excluded from the batch. For example, certain documents that must first be rendered to provide meaningful results to a search query do not benefit from the batched indexing, and are therefore obtained through other means after the documents are rendered. Other documents, such as movies, may also not provide meaningful results to a keyword search using a search engine, and are therefore also excluded from the batch. In another embodiment, the size of the document may exclude it from batch indexing. For example, when the size of the document exceeds the batch size limit (e.g., greater than 50K), the document is retrieved by other means (e.g., another "get document" operation). Once the documents are batched, processing proceeds to block 408.

At block 408, a batch of documents is requested by the crawler from the web service. The web service gets the batch of documents from the database and returns the documents to the crawler. Once the crawler receives the batch of documents, processing moves to decision block 410.

At decision block 410, a determination is made whether more batches need to be retrieved by the crawler corresponding to the retrieved document metadata. If more batches need to be retrieved, processing returns to block 408. However, if further batches need not be retrieved, processing continues to block 412.

At block 412, the documents corresponding to the retrieved batches are forwarded from the crawler to the indexer so that the documents are indexed. The index is therefore updated according to the changes in the documents. Once the documents are forwarded, processing continues at decision block 414

At decision block 414, a determination is made whether a cookie is associated with the web service call that requested the metadata for the N documents. The cookie ensures that documents of a particular container are associated with other documents of the same container for indexing when the number of documents in a container are greater than N. If there is a cookie associated with the documents, processing returns to block 404 where process 400 is repeated for the next set of N documents associated with the cookie. However, if there is no cookie associated with the documents, processing proceeds to block 416, where process 400 ends.

Process 400 describes the initial batch indexing process for the present invention as it relates to a single container of documents. Many containers of documents may be present on a network, and process 400 may be repeated as necessary for batch indexing all the documents on the network.

Figure 5:
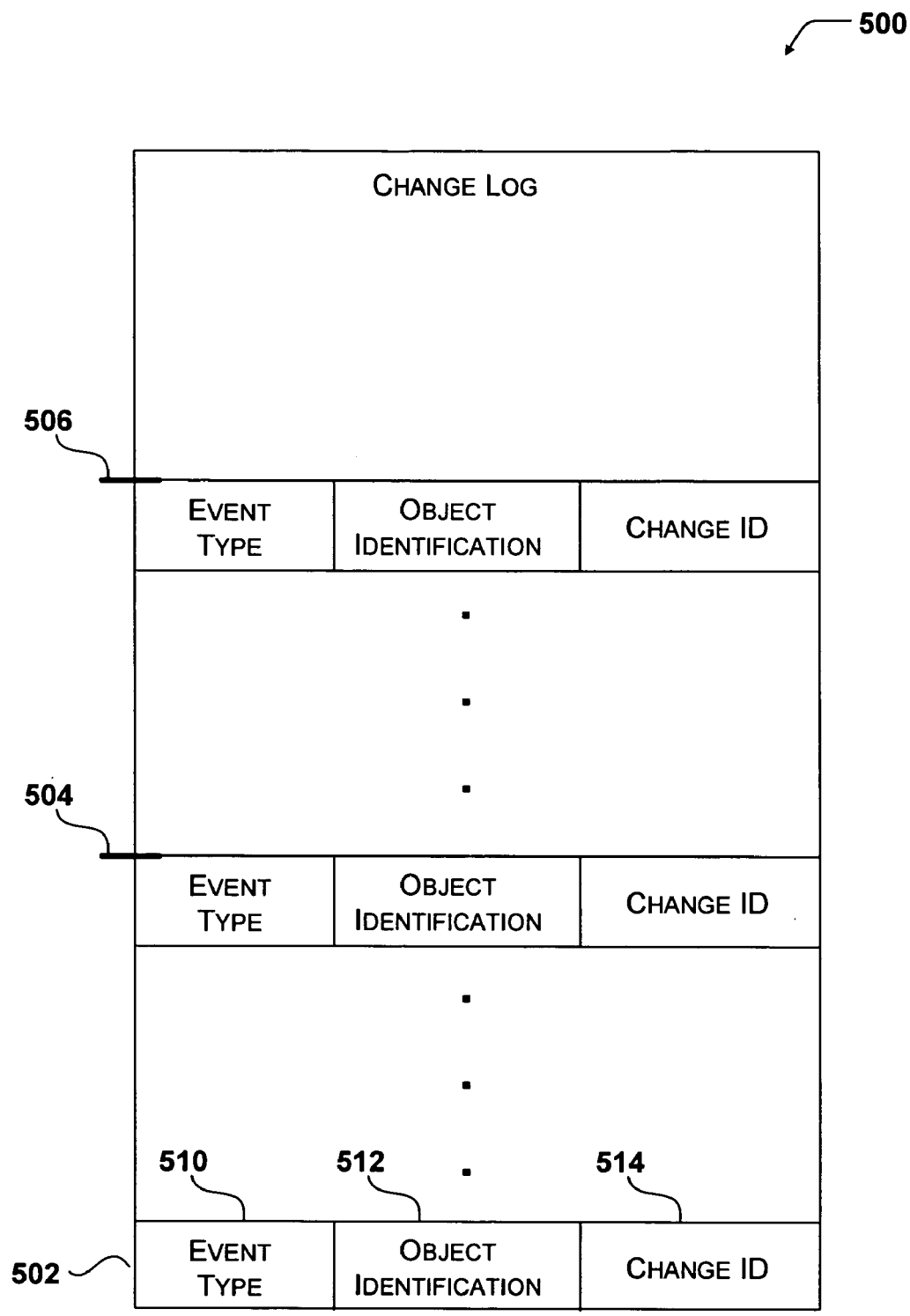
FIG. 5 illustrates a functional block diagram of a change log in accordance with the present invention.

FIG. 5 illustrates a functional block diagram of a change log in accordance with the present invention. Change log 500 includes a number of change records (e.g., 502) structured so that the change log is effectively "filled" with change records as changes occur to the documents on the network. At certain points (e.g., 504 and 506), a new crawl will occur, updating the index and the change ID (e.g., 514) associated with the last change record reflected in the updated index is recorded. In one embodiment, change log 500 is stored in the database of the server (e.g., database 314 in FIG. 3)

Each change record (e.g., 502) includes an event type 510, an object identification 512, and a change ID (i.e., token) 514. Event type 510 refers to the type of change event that occurred corresponding to the change record. Some event types include add, remove, modify, move, and rename events. These events are associated with a particular document according to object identification 512. Object identification 512 refers to identification information sufficient enough to identify the particular object associated with the changed document. Some exemplary information included in object identification 512 includes the document ID, the container ID, object ID, and/or other identifier information for identifying the object corresponding to the changed document. Change ID 514 identifies the change record itself and provides an indication of where in change log 500 the update process is currently.

The points in the change log (e.g., 504 and 506) where the last update occurred may be identified as to the last change ID or the current change ID. The last change ID refers to an identification of the position in the change log for the last change that has been reflected in the index. The current change ID refers to an identification of the current position in the change log at the time the change log is queried for its position. When requested by the indexer, batches of the changes that occurred between the last change ID (e.g., 504) and the current change ID (e.g., 506) are resolved to update the index. Processes for using the change log for batch indexing are described below in the discussions of FIGS. 6 and 7.

Figure 6:
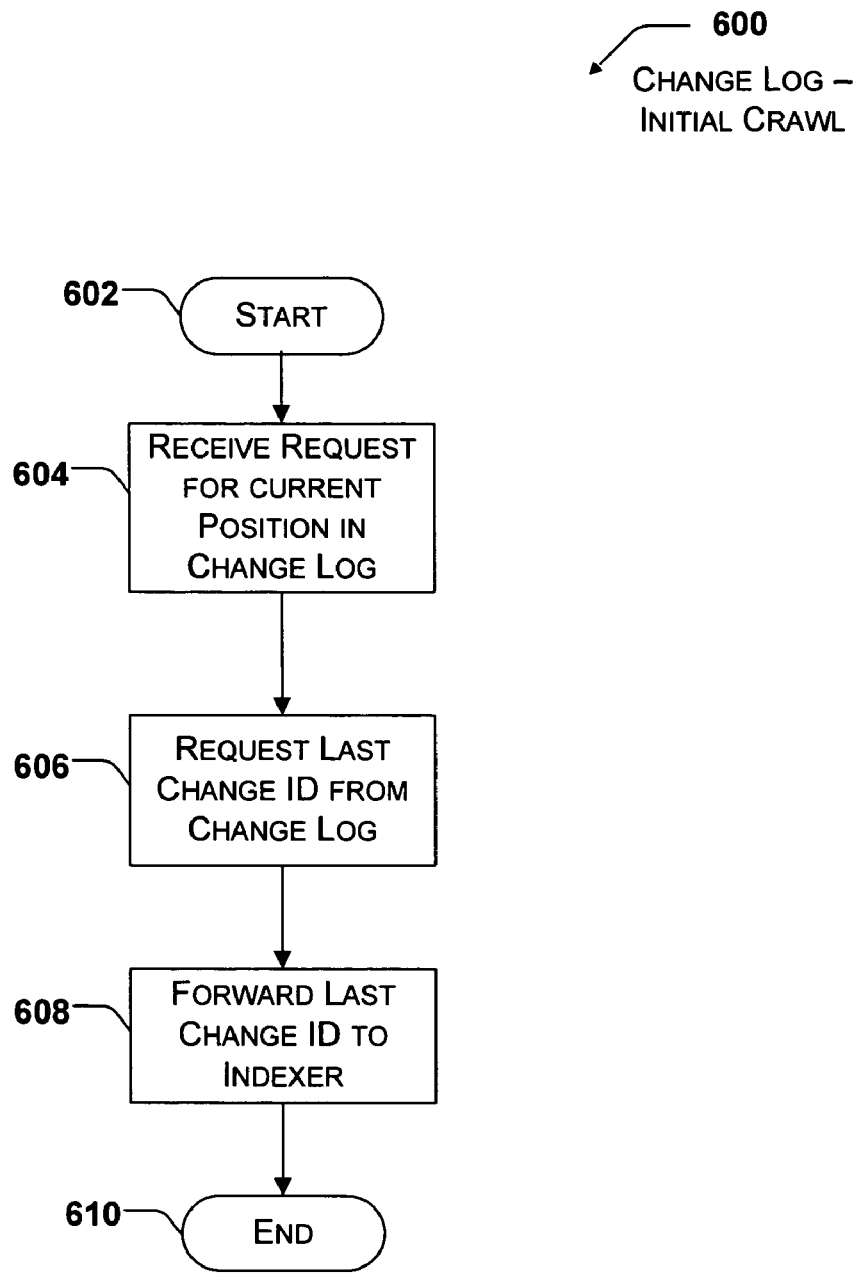
FIG. 6 illustrates a logical flow diagram of an exemplary process for initializing use of a change log during an initial crawl in accordance with the present invention.

FIG. 6 illustrates a logical flow diagram of an exemplary process for initializing use of a change log during an initial crawl in accordance with the present invention. Process 600 starts at block 602 where the indexer commences the initial crawl. Processing continues at block 604.

At block 604, the web service receives a request from the indexer for the current position in the change log. Processing continues at block 606.

At block 606, the web service forwards the request for the current position in the change log to the database, where the request corresponds to a request for the last change ID in the change log. Once the request is forwarded by the web service, processing moves to block 608.

At block 608, the last change ID from the change log is forwarded to the indexer by the web service. The indexer stores the last change ID for future use in the incremental crawls. The incremental crawl process is described below in the discussion of FIG. 7. Once the last change ID is stored by the indexer, processing moves to block 610, where process 600 ends.

In one embodiment, multiple change logs may be on the server corresponding to multiple databases. For multiple change logs, the last change IDs are aggregated before being returned to the indexer.

Figure 7:
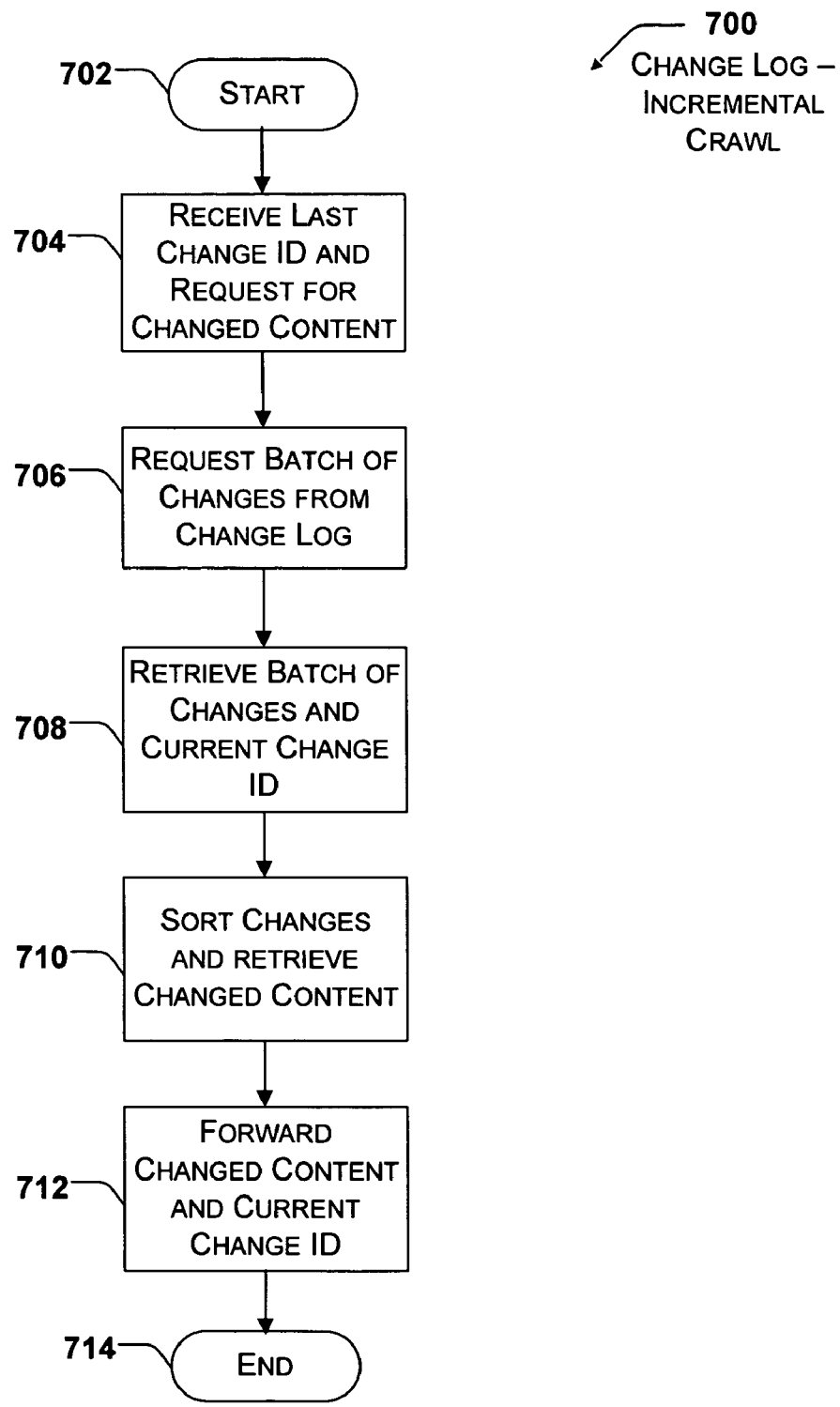
FIG. 7 illustrates a logical flow diagram of an exemplary process for an incremental crawl in accordance with the present invention.

FIG. 7 illustrates a logical flow diagram of an exemplary process for an incremental crawl in accordance with the present invention. Process 700 starts at block 702 where the indexer has initiated the incremental crawl. Processing continues at block 704.

At block 704, a request is received by the web service from the indexer for the changed content. The request includes the last change ID that was previously stored by the indexer (see FIG. 6 above). Once the request is received by the web service, processing continues at block 706.

At block 706, the request is forward to the database as a request for the changes that have occurred in the change log since the position in the change log corresponding to the last change ID. Once this request is received by the database, processing continues at block 708.

At block 708, the web service retrieves a first batch of changes that occurred since the last change ID. In one embodiment, the batch of changes corresponds to the first one thousand change records appearing after the last change ID. The web service also retrieves the current change ID. Once the batch of changes and the current change ID are retrieved, processing continues at block 710.

At block 710 the batch of change records are sorted for retrieving the changed content. For example, changes that occurred to documents within the same container are sorted to be grouped together. Sorting the change records for retrieving the changed content reduces the number of queries to the database by the object model. Once the change records are sorted and the changed content is retrieved, processing moves to block 712.

At block 712, the batched changes in the documents that correspond to the batch of change records retrieved from the change log are forwarded to the indexer. Also forwarded to the indexer is the current change ID that is stored by the indexer. The indexer uses the current change ID as the last change ID for the next incremental crawl. Once the current change ID is stored by the indexer, and the index has been updated according to the forwarded changed content, processing moves to block 714, where process 700 ends.

In one embodiment, multiple change logs may be on the server corresponding to multiple databases. For multiple change logs, the current change IDs and changed content are aggregated before being returned to the indexer.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for batch indexing of documents in a repository, wherein the documents are organized into a hierarchy including sites, subsites, and containers, the method comprising:

sending a first request for information about a site in the hierarchy;

in response to the first request, receiving a list of a plurality of subsites included within the site;

sending a second request for information about one of the subsites in the list of subsites;

in response to the second request, receiving a list of containers included in the one of the subsites;

sending a third request for a batch of document data for a first group of documents stored within one of the containers in the list of containers, wherein the request includes metadata identifying the one of the containers and the first batch of documents;

in response to the third request, receiving the batch of document data for the first group of documents, the document data including a last change identifier identifying a last change made to documents in the site;

indexing the document data of the first group of documents;

storing results of indexing the document data of the first group of documents;

sending a fourth request for changes made to documents organized within the site, the request including the last change identifier;

in response to the fourth request, receiving a batch of changed document data based on the last change identifier, the batch of changed document data comprising changed content for at least one document in the first group of documents;

indexing the batch of changed document data including the changed content; and storing results of the indexing the batch of changed document data.

2. The computer-implemented method of claim 1, further comprising setting a batch size limit that limits the size of the document data of the first group of documents.

3. The computer-implemented method of claim 1, further comprising obtaining metadata corresponding to each document in the repository to determine which of the documents in the repository to include in the first group of documents.

4. The computer-implemented method of claim 3, wherein the metadata corresponding to each document in the repository comprises one or more of: a size of the document and an extension of the document.

5. The computer-implemented method of claim 1, further comprising associating a cookie with the first group of documents when the one of the containers in the list of containers contains a number of documents that is greater than the first group of documents.

6. A system for batch indexing of documents in a repository, comprising:

a computing device arranged as a server, the server configured to execute computer-executable instructions that when executed perform a process comprising:

storing documents within the repository, wherein the documents are organized into a hierarchy including sites, subsites, and containers;

receiving a first request for information about a site in the hierarchy;

sending a list of a plurality of subsites included within the site;

receiving a second request for information about one of the subsites in the list of subsites;

sending a list of containers included in the one of the subsites;

receiving a third request for a first batch of documents stored within one of the containers in the list of containers, the request comprising metadata identifying the first batch of documents;

forwarding the first batch of documents to an indexer;

receiving a fourth request for changes made to documents organized within the site, the request including a last change identifier identifying a last change made to documents organized within the site and previously sent to the indexer;

based on the last change identifier, obtaining from a change log a list of documents that have been changed since a previous request for changes made to documents organized within the site;

obtaining a batch of changed document data from the repository, the batch of changed document data comprising changed content for at least one document stored in the repository; and forwarding the batch of changed document data including the changed content to the indexer.

7. The system of claim 6, wherein the server is further configured to execute computer-executable instructions that when executed perform: recording a last update position in the change log, wherein the change log includes records corresponding to the batch of changed document data.

8. The system of claim 7, wherein the records corresponding to the batch of changed document data each include at least one of an event type, a change identifier, and a document identification.

9. The system of claim 6, wherein the server is further configured to execute computer-executable instructions that when executed perform: setting a batch size limit that limits the size of the first batch of documents.

10. The system of claim 6, wherein the server is further configured to execute computer-executable instructions that when executed perform: obtaining metadata corresponding to each document in the repository to determine which of the documents in the repository to include in the first batch of documents.

11. The system of claim 10, wherein the metadata corresponds to at least one of the size of the document and the extension of the document.

12. The system of claim 6, wherein the server is further configured to execute computer-executable instructions that when executed perform: associating a cookie with the first batch of documents when the first batch of documents corresponds to a document container that contains a number of documents that is greater than the first batch of documents.

13. The system of claim 6, wherein the server is further configured to execute computer-executable instructions that when executed perform: sorting the list of documents that have been changed according to a hierarchy associated with the repository such that obtaining the batch of changed document data requires fewer requests to the repository.

14. A tangible computer-readable storage medium that includes computer-executable instructions for batch indexing of documents in a repository, wherein when the instructions are executed the instructions perform a process comprising:

storing documents within the repository, wherein the documents are organized into a hierarchy including sites, subsites, and containers;

receiving a first request for information about a site in the hierarchy;

sending a list of a plurality of subsites included within the site;

receiving a second request for information about one of the subsites in the list of subsites;

sending a list of containers included in the one of the subsites;

receiving a third request for document data of a first batch of documents stored within one of the containers in the list of containers, wherein the request includes metadata identifying the one of the containers and the first batch of documents;

forwarding the document data to an indexer;

recording a last update position in a change log, wherein the change log includes records corresponding to changes made to documents stored in the repository;

forwarding the last update position to the indexer;

obtaining from the change log a list of documents that have been changed since the last update position;

recording a current update position in the change log;

obtaining from the repository a batch of changed document data corresponding to the list of documents that have been changed, the batch of changed document data comprising changed content for a plurality of documents; and forwarding the changed document data including the changed content and the current update position to the indexer.

15. The computer-readable storage medium of claim 14, wherein the records corresponding to the changes each include at least one of an event type, a change identifier, and a document identification.

16. The computer-readable storage medium of claim 14, further comprising computer executable instructions that when executed perform obtaining metadata corresponding to each document in the repository to determine which of the documents in the repository to include in the first batch of documents.

17. The computer-readable storage medium of claim 16, wherein the metadata corresponds to at least one of the size of the document and the extension of the document.

18. The computer-readable storage medium of claim 14, further comprising computer executable instructions that when executed perform associating a cookie with the first batch of documents when the first batch of documents corresponds to a document container that contains a number of documents that is greater than the first batch of documents.

19. The computer-readable storage medium of claim 14, further comprising computer executable instructions that when executed perform sorting the list of documents that have been changed according to the hierarchy associated with the repository such that obtaining the changed document data requires fewer requests to the repository.

20. The computer-readable storage medium of claim 14, further comprising computer executable instructions that when executed perform aggregating the last update position with other last updated positions and aggregating the current update position with other update positions before forwarding the last update position and the current update position to the indexer when more than one repository are used to provide documents to the indexer.

21. The computer-implemented method of claim 1, wherein the batch of changed document data further comprises changed content for a document organized within the site and not in the first group of documents.

* * * * *